(No Model.) 2 Sheets—Sheet 2.
F. P. DE JONGE.
SEAMING MACHINE.
No. 451,489. Patented May 5, 1891.
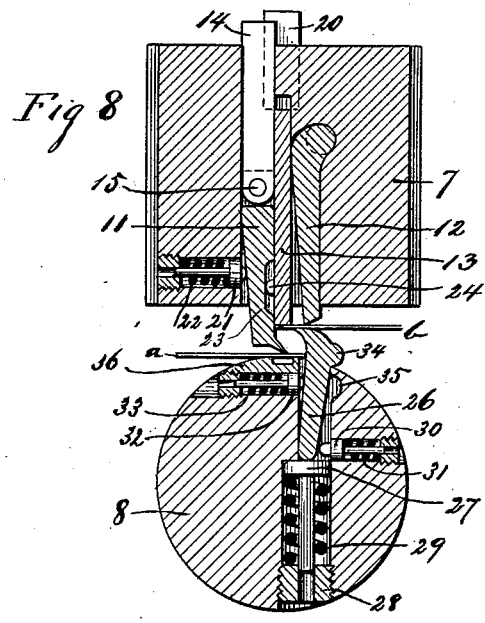
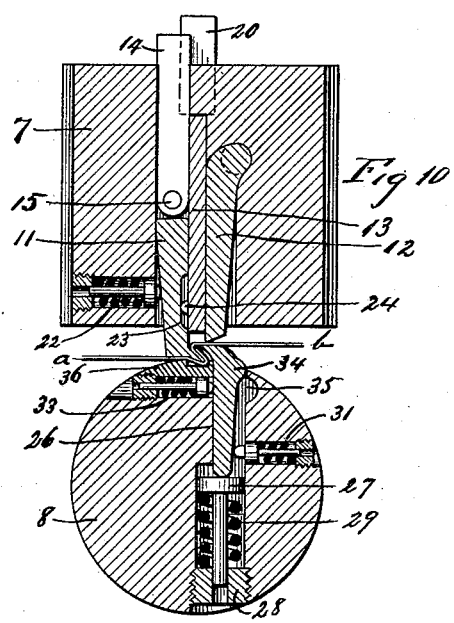
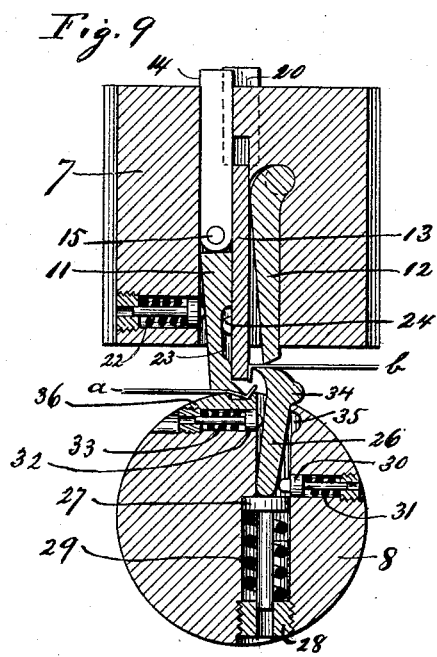
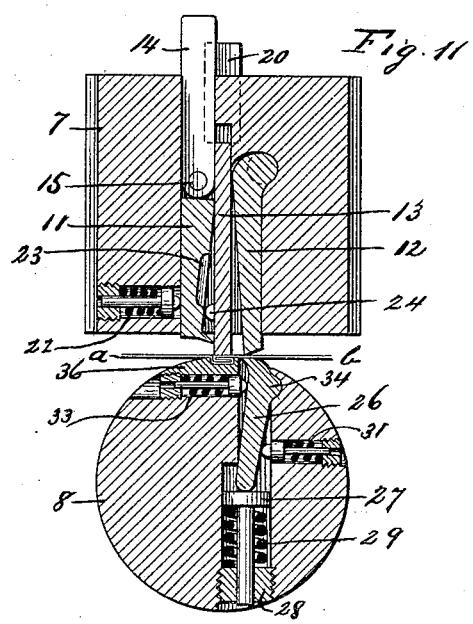
Witnesses
Otto Luebkert
John L. Pearson
Inventor
Frederick P. de Jonge
By Wm. C. Lotz
his Attorney

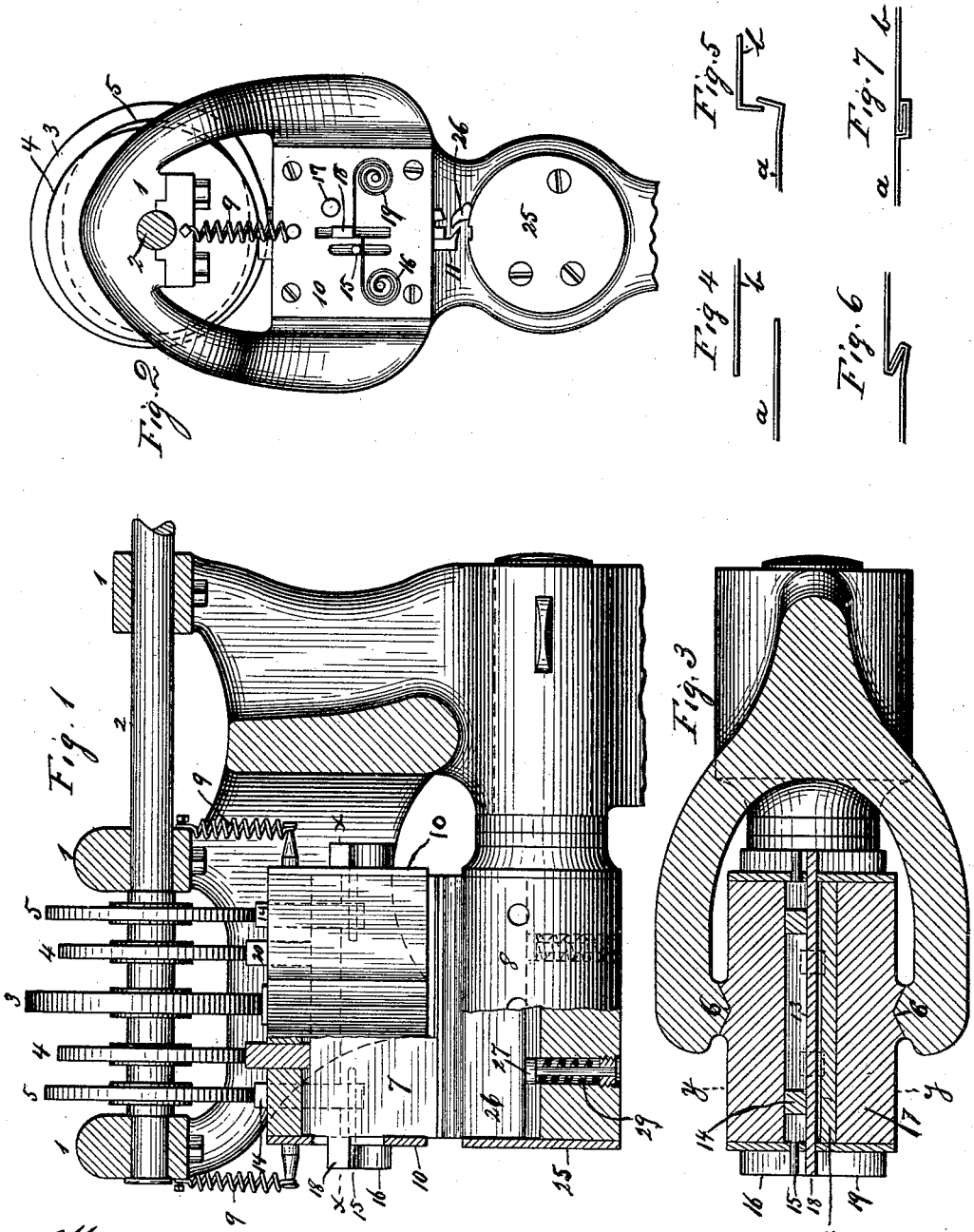

UNITED STATES PATENT OFFICE.

FREDERIK P. DE JONGE, OF AMSTERDAM, NETHERLANDS.

SEAMING-MACHINE.

SPECIFICATION forming part of Letters Patent No. 451,489, dated May 5, 1891.

Application filed December 1, 1890. Serial No. 373,129. (No model.)

*To all whom it may concern:*

Be it known that I, FREDERIK P. DE JONGE, a subject of the King of Holland, residing at Amsterdam, in the Kingdom of Holland, have invented certain new and useful Improvements in Tin-Plate-Seaming Machines, of which the following is a specification, reference being had therein to the accompanying drawings.

This my invention relates to tools or machines for uniting the edges of tin-plate by an interlocking seam, and more particularly for forming the longitudinal seam to the cylindrical shells of tin cans now used in so very large quantities for canned goods; and it has for its object to provide such a tool or machine that with a single operation will complete the seam; and with that object in view my invention consists of the novel devices and combinations of devices hereinafter described and specifically claimed.

In the accompanying drawings, Figure 1 represents a sectional side elevation; Fig. 2, an end elevation, and Fig. 3 a horizontal section on line $x$ $x$ in Fig. 1; Figs. 4, 5, 6, and 7 show the edges of the tin-plates in their progressive relative shapes and positions as the seam is being formed, and Figs. 8, 9, 10, and 11 are cross-sections of the machine, on line $y$ $y$ in Fig. 3, showing the operating parts on their several positions in conformity with the progressive shapes imparted to the tin-plate edges for locking the same.

Corresponding referential characters in the several figures of the drawings designate like parts.

The frame of the machine provides three journal-boxes 1 for a shaft 2, upon which are rigidly mounted five cam-disks or eccentrics 3, 4, and 5, the two cam-disks 4 being of uniform shape and size and the two cam-disks 5 being of uniform shape and size. This shaft 2 is to be driven intermittently by a suitable crank, pulley, or gear-wheel to make one revolution and then stop, to be started again for another revolution, which driving motions being common in punching-machines I have not shown in the drawings. Below shaft 2 the frame is open and provides two vertical V-guides 6, that are parallel with each other, and between these guides 6 is fitted a rectangular head-block 7, to have a vertically-sliding movement therein, and below this head-block 7 is rigidly secured to the frame a cylindrical support 8, projecting horizontally from the frame-standard to be parallel and in line with shaft 2 and block 7. The block 7 is counterbalanced and held in contact with the central cam or eccentric 3 by two spiral springs 9, yieldingly coupling the ends of such block 7 with two of the journal-boxes 1, all in a manner that the rotation of cam-disk or eccentric 3 will impart a vertically-reciprocating movement to such block 7. This block 7 has a longitudinal slot extending vertically to near its top and from end to end of said block, and against the ends of said block 7 are secured by tap-screws plates 10. In the slot of said block 7 are fitted three die-plates 11, 12, and 13, abutting with their ends against plates 10. The die-plate 11 has a toe-shaped lower end, and is connected by hinges with two push-bars 14, projecting through slots in the upper face of block 7, to be in line with cam-disks or eccentrics 5. The pivot-pins 15 of the hinges that connect the push-bars 14 project through vertical slots in plates 10, where each engages the end of a coiled spring 16, secured to plates 10, which springs 16 exert their elastic force to push the die-bar 11 upward and to hold the push-bars 14 in contact with the cam-disks or eccentrics 5. The other die-bar 12 in the opposite side of the slot in block 7 has trunnions 17 to its ends, pivoted in holes in the end plates 10, and the lower projecting end of this die-bar is chamfered. The intermediate die-bar 13 has blunt or squared top and bottom edges, and to its ends it has tenons 18, that extend through vertical slots in end plates 10, resting upon the ends of coiled springs 19, secured against end plates 10. This die-bar 13 also supports two push-bars 20, extending through slotted openings in the top of block 7, to be in line and held in contact with cam-disks or eccentrics 4 by the upward pressure of springs 19. In this manner to the die-bars 11 and 13 is imparted an intermittent reciprocating movement independent of each other by the rotation of cam-disks or eccentrics 4 and 5. The die-plate 12 is permitted a free but limited vibrating movement, and the die-plate 11 has a vibrating movement controlled by two (or more) pistons 21 and springs 22, inserted in horizontal sockets behind such die-plate, and by recesses 23 cut into the inward face of such die-plate 11 and engaging semi-cylindrical protuberances 24 of die-plate 13, whereby with a sliding movement of the die-plates 11 and 12 in opposite directions the protuberances 24 leaving the recesses 23, the die-plate 11 will be forced back, compressing springs 22. The cylindrical support 8 has also a longitudinal groove, closed by the end plate 25, secured by tap-screws, and into this groove is inserted a die-plate 26, having a sidely-projecting toe to its upper protruding end, directed toward the toe of the die-plate 11. The lower rounded edge of this die-plate 26 rests upon a series of pistons 27, inserted into vertical sockets below such die-plate, and the stem of each such piston being guided in a bottom screw-plug 28 is surrounded by a strong spiral spring 29. The groove for die-plate 26 being wider than the said die-plate, thus providing for a vibrating movement for said die-plate, it is yieldingly held on an inclined position at its bottom by a piston 30, inserted into a horizontal socket and pushed inward by a spiral spring 31, and near its top by a piston 32, pushed inward from the opposite side by a spring 33. This die-plate 26 on the side opposite to its toe has a semi-cylindrical protuberance 34, which by pushing the die-plate downward so as to compress spring 29 will cause its toe to be moved sidewise, thereby compressing spring 33, and with pushing the die-plate 26 still farther downward its protuberance 34 will enter a recess 35, into which it will be pressed again by spring 33.

On the side to which the toe of die-plate 26 projects the cylindrical support 8 has fitted and rigidly secured a steel matrix-plate 36, having a longitudinal groove or recess of proper depth and width.

$a$ and $b$ represent the edges of the sheet or sheets of tin-plate to be connected by seaming, and Figs. 4, 5, 6, and 7 show the progressive operation of forming the lap-seam.

The operation of the machine can be followed by reference to Figs. 8, 9, 10, and 11, which I will now describe. The edge $a$ of a sheet of tin-plate being placed on matrix-plate 36 under die-plate 11 and against die-plate 26, and the edge $b$ of the sheet being placed over die-plate 26 and under die-plates 12 and 13 against die-plate 11 during the first one-quarter of a revolution of shaft 2, the cam-disk 3 will push downward the head-block 7 sufficiently to clamp the edges of the plates $a$ and $b$ between the die-plate ends and the matrix-plate, as shown by Fig. 8. During the next one-quarter of a revolution of shaft 2 the head-block 7 is held on its acquired position, while the cam-disks 4 and 5 will push downward the die-plates 11 and 13, the toe of the die-plate 11 pressing the edge of plate $a$ into the groove of matrix-plate 36, while the die-plate 13 bends the edge of plate $b$ over the toe-edge of cam-plate 26 to be rightangular, as shown by Fig. 9. During the next one-quarter of a revolution the die-plate 13 is released to move upward, while the head-block 7 is pushed farther downward, whereby the die-plate 12 will push downward the cam-plate 26, which thereby, on account of its protuberance 34, must swing toward cam-plate 11, whereby the edges of both plates $a$ and $b$ will be bent to interlock and then compressed between the toes of die-plates 11 and 12 to form acute angles, as shown by Fig. 10, and during the last one-quarter of a revolution the die-plate 11 is released to move upward, the head-block 7 is pushed still farther down, whereby die-plate 26 is pushed into its groove for the protuberance of the same to enter recess 35, thus clearing the matrix-plate 36, while die-plate 13 is pushed downward, at the same time compressing the seam into the groove of matrix-plate 36 and flattening the same down, so as to be completed, as shown by Fig. 11.

What I claim is—

1. In a machine for the purpose described, the combination, with the cylindrical support 8, provided with rigid matrix-plate 36 and with cam-plate 26, yieldingly sustained in support 8, of the vertically-reciprocating head-block 7, slotted and provided with the swinging die-plate 12, and the vertically-movable die-plates 11 and 13, independently operated by suitable cam-disks or eccentrics, substantially as set forth, to operate as specified.

2. In a machine for the purpose described, the combination, with the cylindrical support 8, provided with rigid matrix-plates 36 and with cam-plate 26, vibratable and yieldingly sustained in a groove of support 8 and provided with a toe-shaped upper end, of the vertically-reciprocating head-block 7, slotted and provided with the vibratable die-plate 12, the vertically-movable and vibratable die-plate 11, having a toe-shaped lower end, and the vertically-movable die-plate 13, having a squared end, the head-block 7, as well as the die-plates 11 and 13, being imparted intermittent motion by means of cam-disks or eccentrics, all mounted upon a single shaft, substantially as set forth, to operate as specified.

In testimony whereof I affix my signature in presence of two witnesses.

FREDERIK P. DE JONGE.

Witnesses:
 ULRICH R. MAERZ,
 FRED. V. S. CROSBY.